APPARATUS FOR BANDING BALES

Original Filed Jan. 31, 1964 9 Sheets-Sheet 1

Joseph C. Neitzel
Tibor Laky
INVENTORS

BY Bertram H. Mann
ATTORNEY

APPARATUS FOR BANDING BALES

Original Filed Jan. 31, 1964 9 Sheets-Sheet 2

Joseph C. Neitzel
Tibor Laky
INVENTORS

BY

Bertram H. Mann
ATTORNEY

APPARATUS FOR BANDING BALES

Original Filed Jan. 31, 1964 9 Sheets-Sheet 3

Joseph C. Neitzel
Tibor Laky
INVENTORS

BY Bertram N. Mann
ATTORNEY

APPARATUS FOR BANDING BALES
Original Filed Jan. 31, 1964
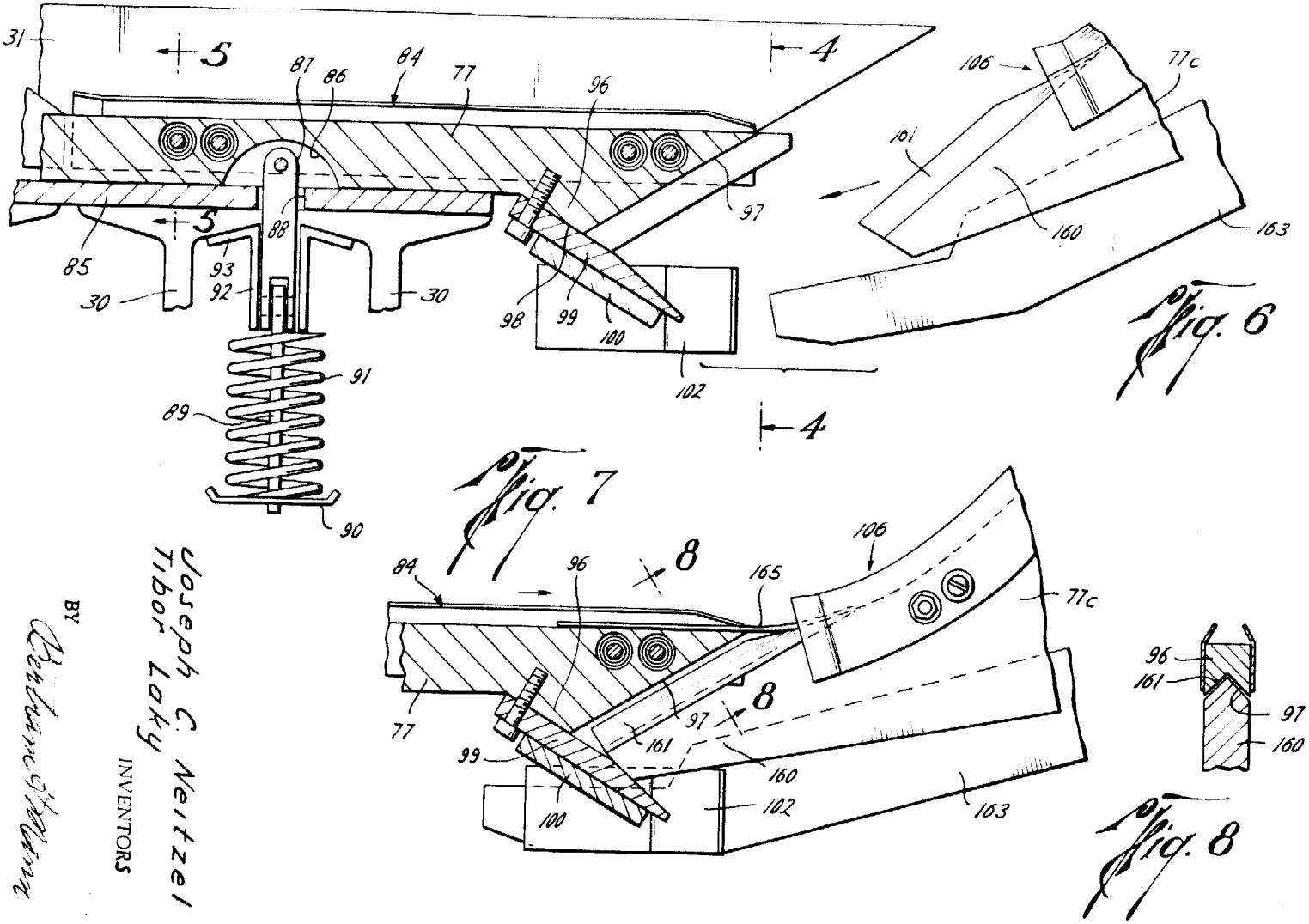
Joseph C. Neitzel
Tibor Laky
INVENTORS
BY Berman & Mann
ATTORNEY

APPARATUS FOR BANDING BALES

Original Filed Jan. 31, 1964 9 Sheets-Sheet 6

Joseph C. Neitzel
Tibor Laky
INVENTORS

BY Bertram Brann
ATTORNEY

APPARATUS FOR BANDING BALES

Original Filed Jan. 31, 1964 9 Sheets-Sheet 7

Joseph C. Neitzel
Tibor Laky
INVENTORS

BY Bertram & Blum
ATTORNEY

APPARATUS FOR BANDING BALES

Original Filed Jan. 31, 1964 9 Sheets-Sheet 8

Joseph C. Neitzel
Tibor Laky
INVENTORS

BY Bertram H. Mann
ATTORNEY

APPARATUS FOR BANDING BALES

Original Filed Jan. 31, 1964 9 Sheets-Sheet 9

Joseph C. Neitzel
Tibor Laky
INVENTORS

BY Bertram S. Mann
ATTORNEY

United States Patent Office

Re. 26,289
Reissued Oct. 17, 1967

26,289

APPARATUS FOR BANDING BALES

Joseph C. Neitzel and Tibor Laky, Dallas, Tex., assignors, by mesne assignments, to Murray Company of Texas, Inc., Dallas, Tex., a corporation of Texas Original No. 3,213,780, dated Oct. 26, 1965, Ser. No. 341,526, Jan. 31, 1964. Application for reissue May 26, 1966, Ser. No. 559,032

13 Claims. (Cl. 100—4)

Matter enclosed in heavy brackets [ ] appears in the original patent but forms no part of this reissue specification; matter printed in italics indicates the additions made by reissue.

This invention relates to apparatus for automatically banding resiliently compressible objects such as bales of cotton.

Heretofore, the normal procedure for banding of cotton bales has been to have workmen individually direct each band around the bale by hand and manually apply securing buckles and identifying tags to the bands before releasing the bale from the press. A standard gin cotton bale requires six of such bands, while a "standard density" bale requires eight bands and a "high-density" bale requires nine bands. While the trend in the cotton ginning industry, as elsewhere, is toward high speed production for the reduction of costs, a limiting factor for high capacity has been the manual banding procedure. With the present type of baling press, either three or four workmen are required at the press, but, nevertheless, are limited to a production of not more than 20 bales per hour.

While automatic banding machines have been provided for cartons, grain sheaves, coils of wire, and the like, none of these machines is adapted for use in banding bales of cotton. For instance, standard cotton bales must be of a definite size, shape, and weight and the banding extends across the faces of the bale which are exposed through and face the press box doorway. Thus, guideway tracks must be provided for the banding material and the portions of these tracks which traverse the press box doorways must be shiftable to clear these doorways to permit access to the bale for completing the wrapping steps and for removal of the bale from the press.

Furthermore, a substantial clearance, conventionally is provided around the edges of the bottom follow block or platen, which is hydraulically actuated to press the bale, and this follow block is subject to limited play and, therefore, disalignment. Accordingly, some means must be provided to insure realignment of the portions of the guide tracks which traverse the follow block so that properly aligned and connected guides may be formed entirely around the press box. Still another problem in the banding of cotton bales results from the necessity of [trucking] *tucking* the edges of the wrapping material beneath the end bands before they are tightened about the bale.

Accordingly, the main object of the present invention is to provide means for automatically banding cotton bales.

Another object is to equip a more or less conventional cotton press with band guide tracks and band feeding and securing equipment.

Another object is to equip a press box with band guiding tracks including portions for traversing the box doorways which portions are shiftable clear of the doorways to permit withdrawal of the bale therethrough.

Still another object is to provide such guide tracks including parts carried by the follow block with special means for insuring alignment of these latter parts with adjacent track parts, notwithstanding disalignment of the follow block.

In accordance with the present invention the press box is equipped with band guide tracks, including parts which extend between the bars of and across the follow block and top platen and other parts mounted on frames which, in their operative positions, traverse the box doorways. These frames are pivotally or slidably mounted on the press and powering means are provided for shifting the frames and guide tracks clear of the doorways to permit access to the bale and withdrawal of the bale from the press. When the frames are returned to their operating positions across the doorways, after the press doors are opened, the track parts carried thereby interfit with the track parts which are resiliently carried by the follow block in a manner to assure alignment of these track parts.

In the accompanying drawings which illustrate the invention,

FIG. 6 is an enlarged vertical transverse section showing cooperating portions of the follow block and registering bottom and front band track parts prior to engagement;

FIG. 7 is a similar view, but showing the track parts in engagement;

FIG. 8 is a detailed section taken on line 8—8 of FIG. 7;

Figure 1:
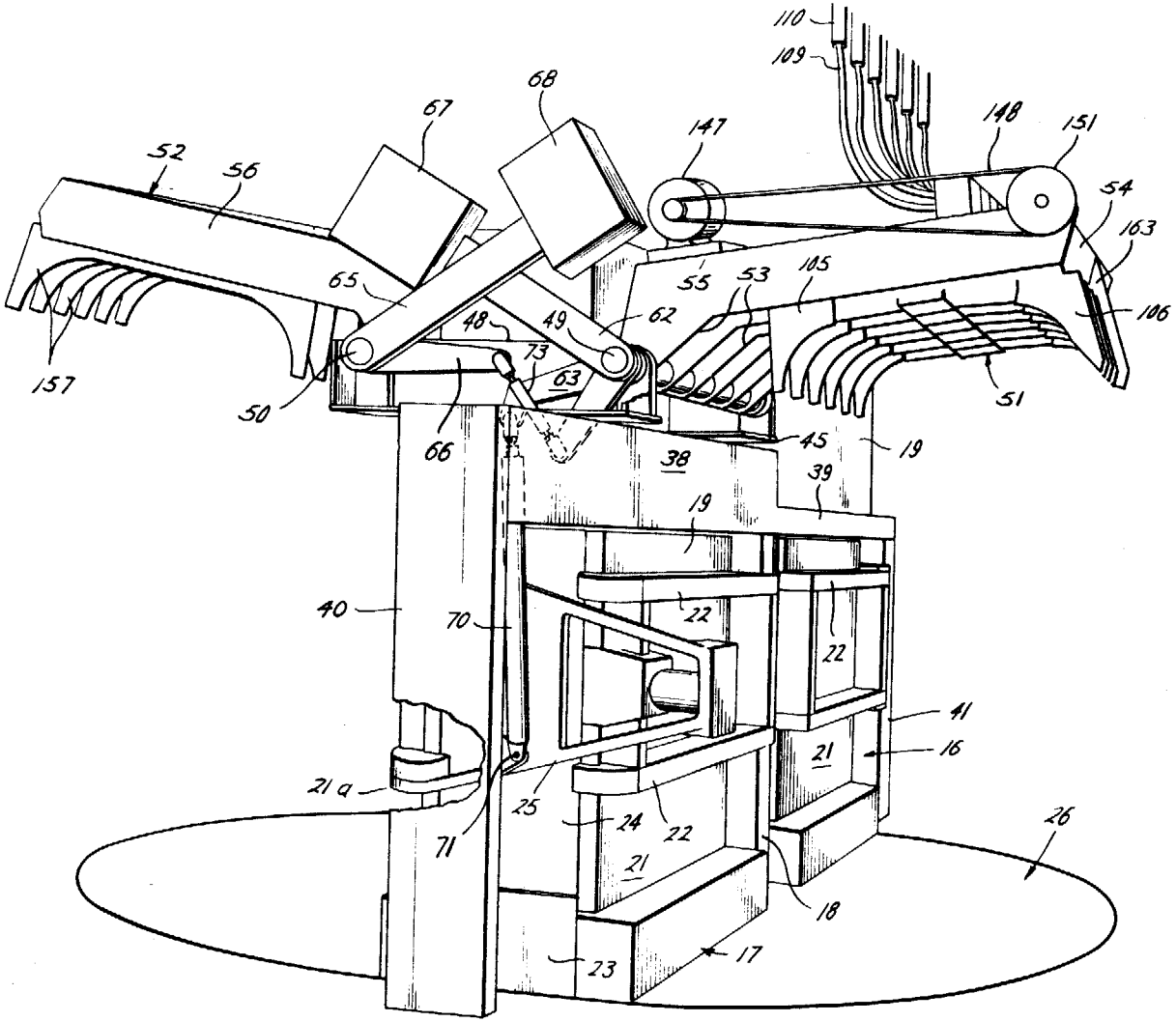
FIG. 1 is a perspective view of a two box tramper press having applied thereto a form of the automatic banding equipment of the present invention in the elevated or open position.
Figure 2:
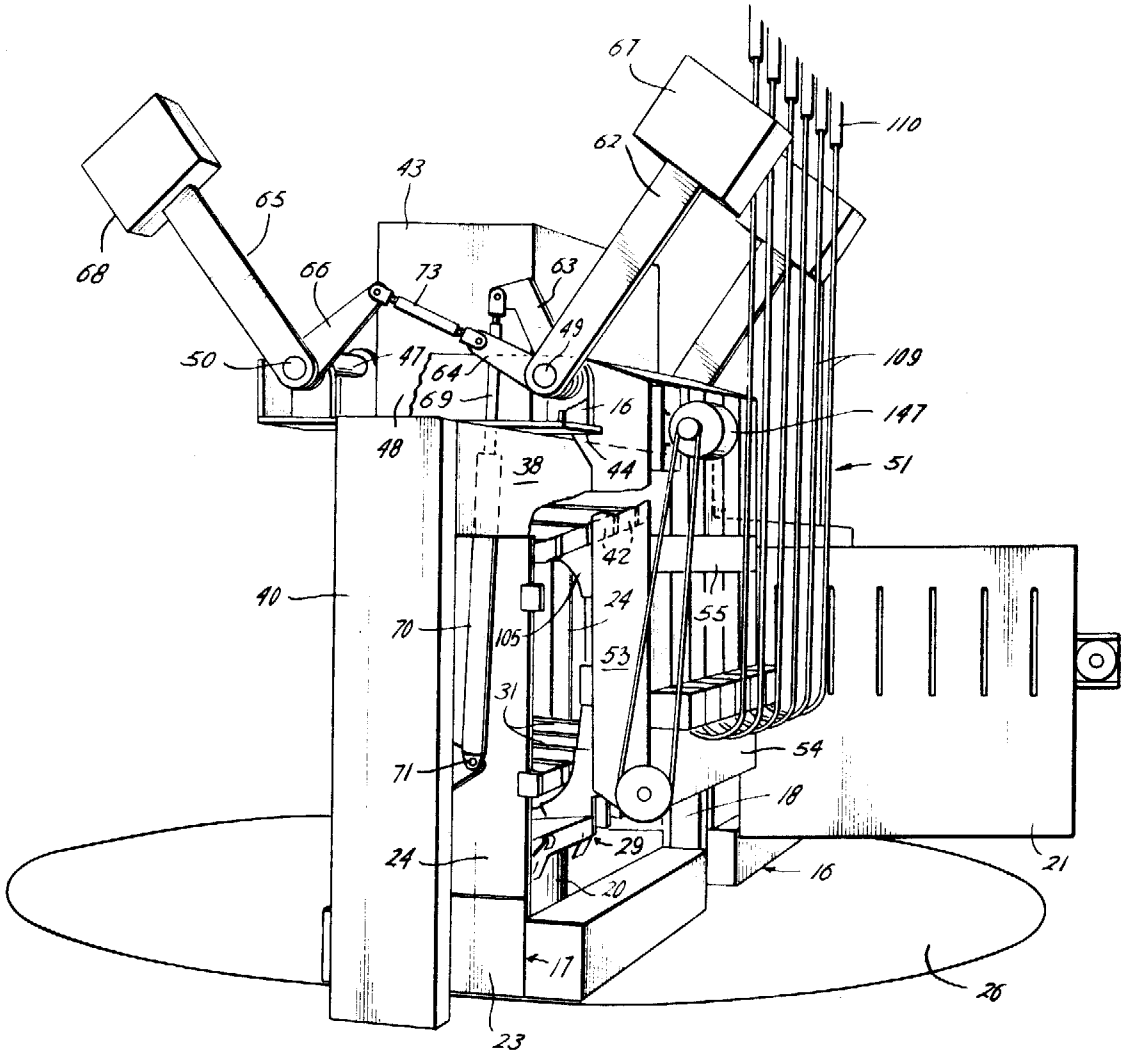
FIG. 2 is a similar view of the press with the doors on the ram side open and the banding equipment lowered into operating position.
Figure 3:
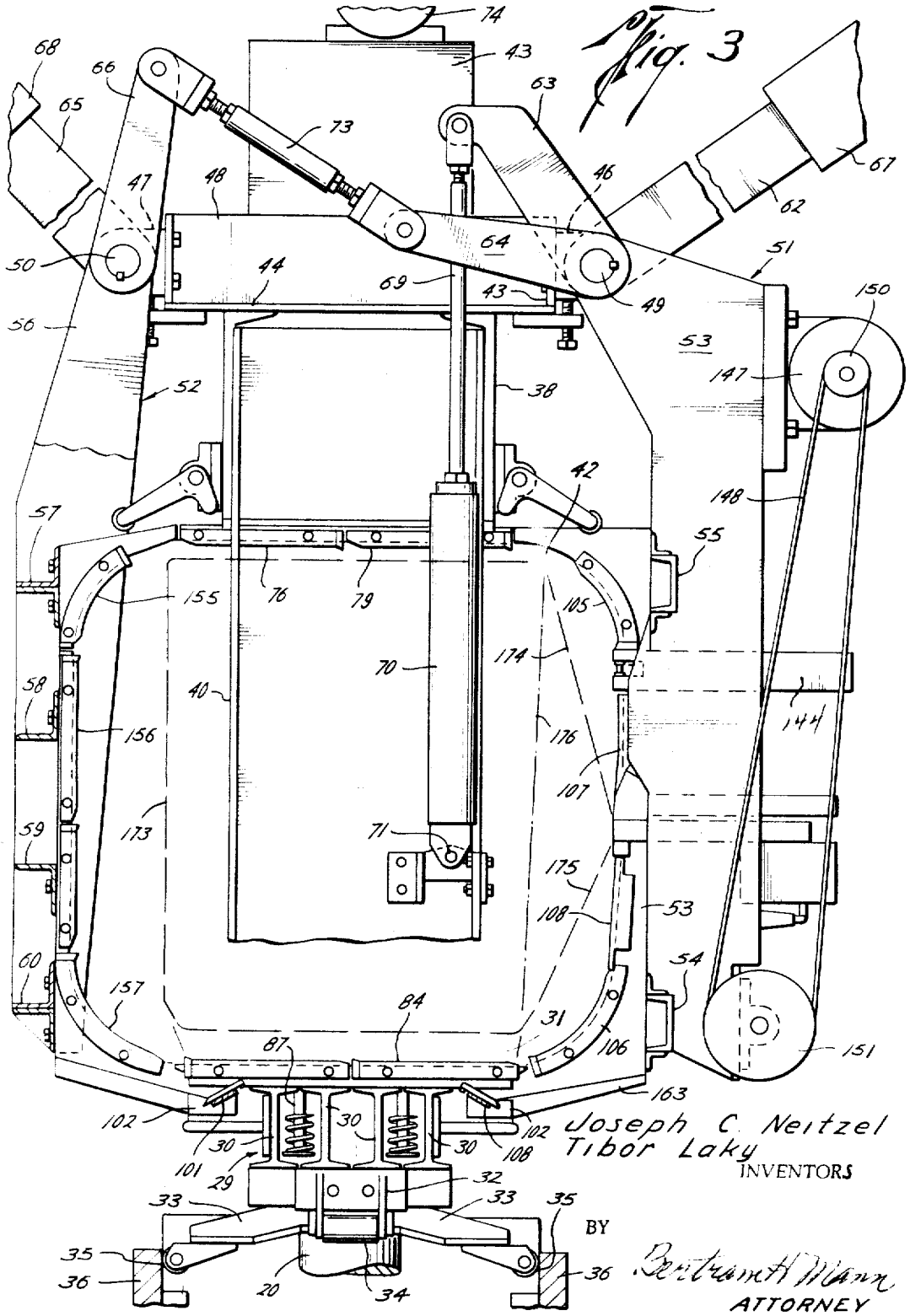
FIG. 3 is a side view in part in vertical section of the banding equipment in closed position.

FIGS. 1 and 2 show a conventional two box press having identical box portions 16 and 17 pivotally mounted upon a central support post 18 in such a manner that the boxes can be alternately positioned in the filler space beneath a tramper feed shoot 19 and in the press space above a hydraulic ram 20 (FIGS. 1, 2 and 3). Each box has a front door 21 and a corresponding back door braced by heavy ribs 22 by which the doors are hinged to center structure 18.

The box side walls include stationary lower parts 23 and upper parts 24, the latter being hinged at their bottom edges so as to be [titled] *tilted* outwardly when the pressed bale is to be wrapped and bound and withdrawn. This is a conventional feature (see Liddell Patent No. 522,220, for instance) and is not detailed here. The doors and side walls are secured together during the pressing operation by hydraulic clamps indicated generally at 25. The boxes extend substantially below the floor level of the gin house and are provided with circular floor portions 26 for covering the pit provided for the ram and rotating mechanism.

As best shown in FIG. 3, a heavy ram 20 projects upwardly from the hydraulic press (not shown) for engaging the under surface of the follow block structure generally designated 29 which is provided at the bottom of the box in the press space. The follow block consists of parallel I beams 30 with their webs vertical and with spaced bale engaging bars 31 laid thereupon (FIG. 2). Transverse members 32 and 33 mounted on the bottoms of the I beams mount centering guide rollers 34 and 35 which, respectively, ride along lower front and back box wall parts 36 and side wall parts 23 (FIG. 1).

The boxes are framed by heavy top sill structures 38 and 39 and side uprights 40 and 41 and center post structure 18. On the under surface of sill part 38 are secured the top platen bars 42 paralleling and constructed generally the same as follow block bars 31.

In the use of this known type of two box press, a charge of ginned cotton is tramped into the box 16, whereupon the boxes are rotated 180 degrees. While one box is being filled by the tramper, follow block 29 of the other box is being forced upwardly by hydraulic ram 20 to compress the cotton to the proper density. At the end of the follow block movement, hydraulic door locking yoke 25 is released, the side walls 24 are tilted outwardly, and the front and back doors of the box are opened, as shown in FIG. 2. Thereupon the pressed bale is ready for wrapping and banding.

According to the present invention, a super structure 43 and transverse plates 44 and 45 are mounted on top of heavy, top sill structure 38 on the press side. Four journal bearings 46 and 47 braced by cross beams 48 project from the ends of plates 44 and 45 and rotatably mount parallel horizontal shafts 49 and 50. Rigidly secured to these shafts are the front and back band guide carrying jaw structures, generally designated 51 and 52. Front structure 51 is [build] *built* up of spaced, side by side plates 53 connected by cross bracing, as at 54 and 55. The present apparatus is designed to apply six bands simultaneously and, therefore, seven of the plates 53 are provided to accommodate the band tracks and control apparatus therebetween. The rear jaw structure 52 (FIG. 3) is made up from seven similarly arranged, longitudinal plate members 56 keyed to rear horizontal shaft 50 and braced by transverse members 57, 58, 59 and 60.

Also rigidly secured to front jaw pivoting shaft 49 are three crank arms 62, 63, and 64, while rear jaw pivoting shaft 50 has crank arms 65 and 66 rigid therewith. Arms 62 and 65 support heavy counterbalance weights 67 and 68. Arm 63 is pinned at its free end to a shaft 69 projecting from the piston of a hydraulic motor 70 pivoted at 71 to the press frame side upright 40. Third arm 64 on shaft 49 is connected by a link 73 to arm 66 rigid with rear pivot shaft 50. Thus, hydraulic motor 70 is operatively connected to pivot shafts 49 and 50 for rotating the same and jaw structures 51 and 52. A motor and pump set for providing hydraulic pressure is indicated at 74.

Figure 5:
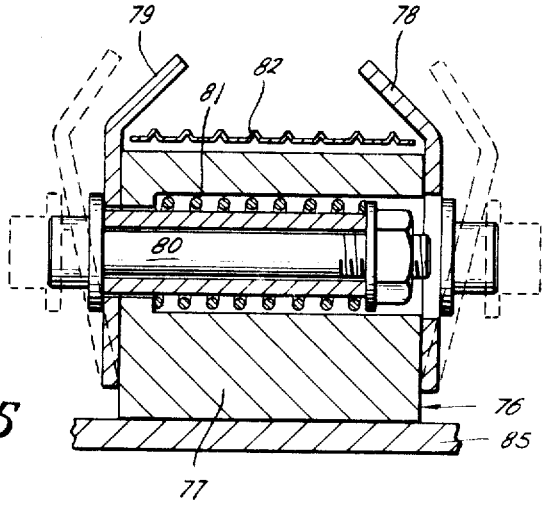
FIG. 5 is an enlarged transverse section showing a portion of one of the banding tracks and taken on line 5—5 of FIG. 6.

Extending between and parallel to bars 42 of the top platen (FIG. 3) and secured to the under surface of the top sill structure are six band guide track members 76, each formed, as shown in FIG. 5, of a body part 77 and pairs of side flanges 78 and 79 with inwardly bent extremities partially overlying the body and resiliently secured thereto by bolt elements 80 and compression springs 81. Body 77 and flanges 78 and 79 form a partially confined trackway for receiving banding material indicated at 82. This detail of structure, in itself, does not constitute the present invention and, therefore, is not further described herein. Other track constructions may be provided if desired.

Figure 4:
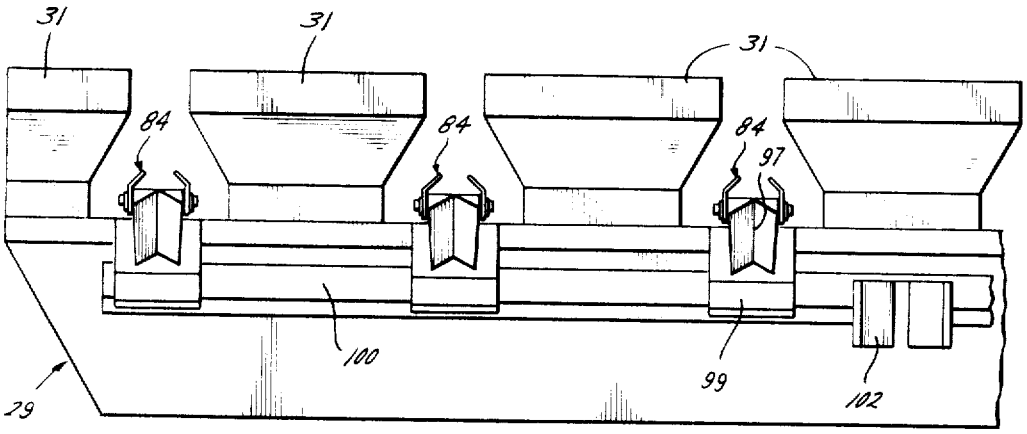
FIG. 4 is a partial front view of the follow block and associated band track parts shown considerably enlarged.

Also, extending in the slots between bars 31 on the follow block and parallel thereto are the band guide track members 84 (FIGS. 3 and 4) constructed similarly to track members 76. However, the lower track members are resiliently supported from the follow block, as illustrated in FIGS. 3 and 6, so that these track sections are self-adjusting to properly align themselves with the corresponding track sections carried by the front and back jaw structures, as will be described. The bottom track members normally rest upon plates 85 interposed between I beams 30 and transverse bars 31. The continuous body part 77 of each lower track section 84 has a pair of semi-circular recesses, as 86, in each of which there is pivotally secured a link 87 which depends through an aperture 88 in the underlying plate 85. Each link 87 is pivotally secured at its lower end to a stem 89 which carries a seat 90 upon which rests a coiled compression spring 91. Spring 91 at its upper extremity bears against the lower ends of link guide angles 92 having flanges 93 secured to the under surfaces of the top flanges of I beams 30. This link and spring structure, therefore, resiliently holds the track member 84 against plate 85.

The body portion 77 of each track section 84 is enlarged at each end, as at 96, and is provided with a downwardly and inwardly inclined, inverted dovetail or V-groove 97 merging with an oppositely inclined under surface 98. An end plate 99 is bolted to surface 98 beneath each groove 97. A plate 100 extends beneath all the guide plates 99 and is welded or otherwise secured thereto for rigidly securing together all of the band tracks 84. A similar sloped transverse member 101 extends along the rear edge of the follow block and is secured to the corresponding guide plates beneath the dovetail slots in the rear ends of the track body members. A horizontal centering structure 102 projects outwardly from each transverse bar 100 and 101 and presents an outwardly facing V-shaped recess for purpose to be described.

Figure 9:
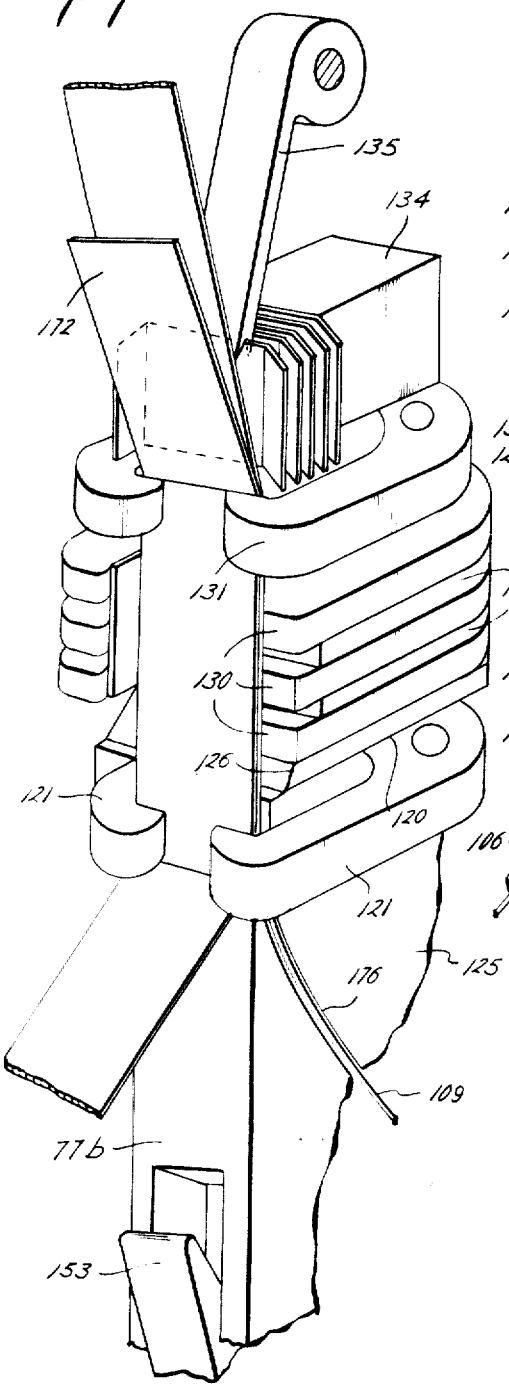
FIG. 9 is an enlarged perspective view showing the band clamping, sealing, and cutting head parts.
Figure 10:
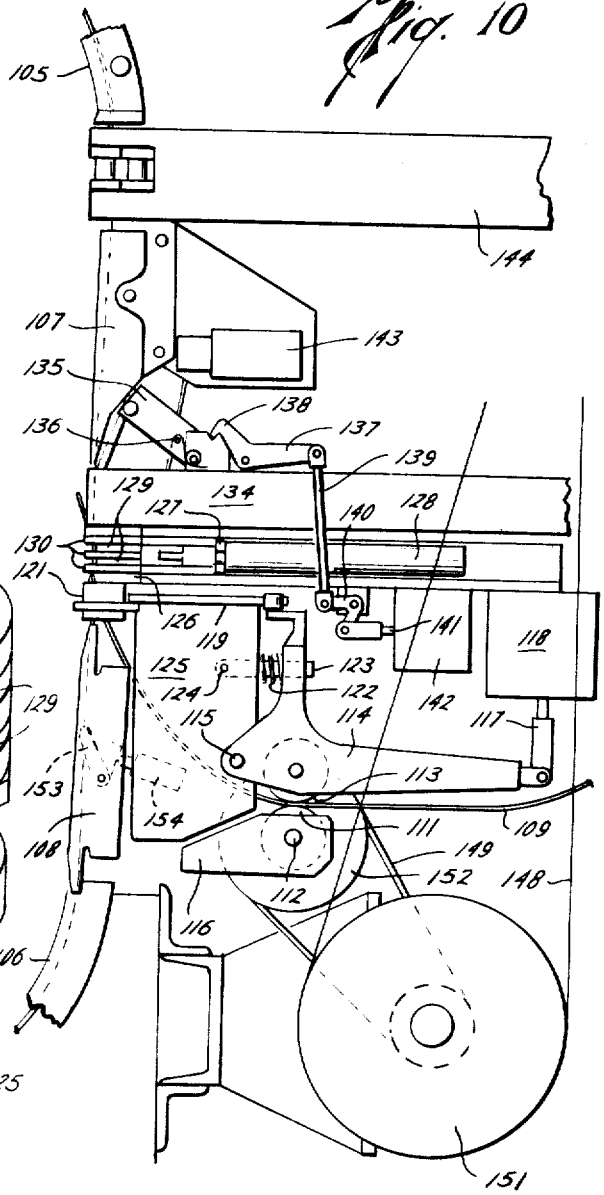
FIG. 10 is a side view of the band sealing and associated parts on a somewhat smaller scale than FIG. 9.
Figure 11:
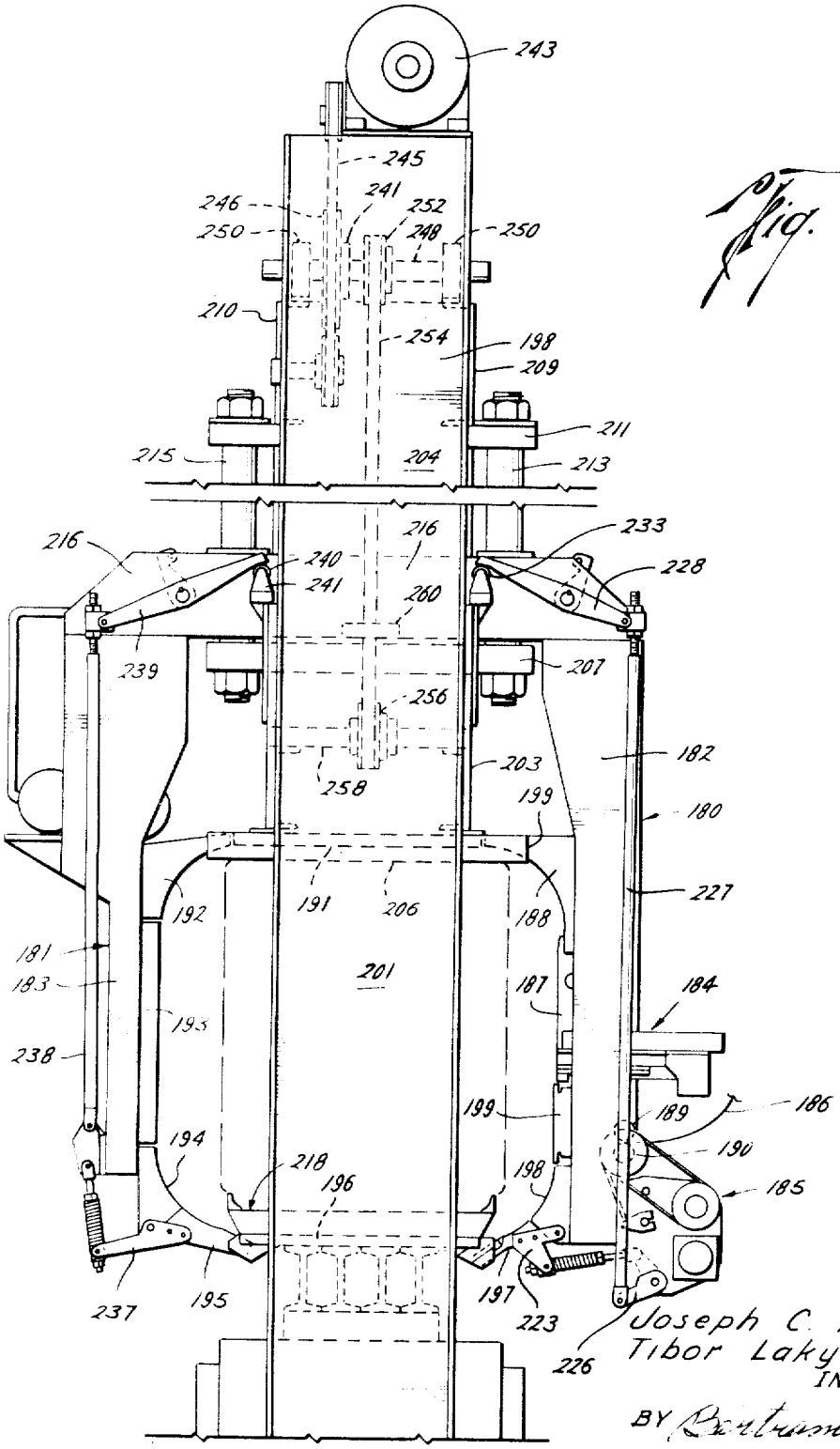
FIG. 11 is a side view showing a modified form of banding apparatus.

As shown in FIGS. 1 and 3, a continuous band guide track section extends between each adjacent pair of jaw structure forming plates 53 and 56. These track sections are constructed, in general, as shown in FIG. 5. However, each front track section includes upper and lower curved end portions 105 and 106 and intermediate portions 107 and 108. Also mounted between each pair of front jaw structure plates 53 are the feeding, clamping, and sealing head mechanisms as shown in FIGS. 9 and 10. The banding material 109, which enters the spaces between jaw forming plates 53, as shown in FIG. 2, through multiple feed tubes 110, passes between a knurled feed roll 111 on a stub shaft 112 (FIG. 10) and a clutching feed roll 113 mounted on a bell crank 114 having a central pivotal mount 115. Shaft 112 is journalled in a stationary bracket 116. The right end of bell crank 114 is pinned to an actuating stem 117 projecting from a control solenoid 118. The other end of bell crank 114 is connected by means of a link 119 to the short inwardly projecting arms 120 of clamping jaws 121 (FIG. 9). The bell crank is constantly urged clockwise to engage clutching rollers 111 and 113 by a coiled spring 122 received upon a stem 123 pivotally mounted at 124 on the support body 125 of the banding head mechanism.

Slidably received immediately above lower clamping jaws 121 is a shear blade 126 which is normally urged rightwardly by spring means (not shown) and which may be urged leftwardly to sever the bale encircling band from the stock by a collar 127 on the plunger projecting from a hydraulic motor 128. Also operated by motor 128 are seal securing plungers 129 slidable between guides 130. Above the seal securing elements are a pair of upper gathering jaws 131 also hydraulically impelled by motor 128.

Mounted above upper jaws 131 is a seal magazine, generally designated 134, and pivoted on top of this magazine is a seal advancing arm 135 which is constantly urged toward its lifted, clockwise position, as shown in FIG. 10, by a spring 136. A latching crank 137 has a detent forming arm 138 for latching seal advancing arm 135 in its lifted position, and its other arm is pinned to a link 139 connected by bell crank 140 to the stem portion 141 of an actuating solenoid 142. At 143 is shown another element of the seal control mechanism. Mounted above element 143 is a bale tag applying magazine 144 through the left end of which the banding stock passes for the application of bale identifying tags. All of the band feeding, clamping, sealing, and control mechanisms, as described, are commercially obtainable from Acme Steel Company, and reference is made to Patents Nos. 3,101,663, 3,120,171, and 3,139,813 for further description thereof. Since these parts, in themselves, do not constitute the present invention, they are only generally referred to here in relation to the other parts of the banding equipment and press.

As shown in FIGS. 3 and 10, an electric motor 147 mounted on forward guide mounting jaw structure 51 drives the band feeding and control mechanism by means of belts 148 and 149 and sheaves 150, 151, and 152. The band feeding and controlling mechanisms operate in the sequence as described hereafter and suitable powering circuitry will be provided for achieving these results. A band trip lever 153 projects from body 77 of intermediate track section 108 for actuating a switch 154, as will be explained.

Band guide track sections 155, 156, and 157 (FIG. 3) are mounted between the plates or bars 56 of the rear track supporting jaw structure 52. These track sections are constructed, in general, similar to the front track guides heretofore described, but no driving or control mechanisms are associated therewith. The upper curved sections 105 and 155 of the front and back track members are positioned to readily register and align with stationary upper track sections 76, when the jaw structures are lowered to their banding positions, as shown in FIG. 3. However, lower curved track sections 106 and 157 are provided with means assuring horizontal as well as vertical alignment therewith of lower track sections 84 which are resiliently carried by the follow block, notwithstanding initial disalignment of the lower tracks due to twisting, tilting, or other play of the follow block. Both track aligning structures are as shown in FIGS. 6, 7, and 8. The body portion 77c of bottom curved track section 106 has an extended nose 160 which is tapered along its upper edge to form an inverted V-section part 161 which cooperates with dovetail part 97 in the end of the body portion 77 of track 84 to vertically align the lower and front track sections. FIGS. 7 and 8 show the guiding elements in register. The end of nose 160 may engage plate 99 as a further stabilizing and guiding feature.

Projecting from the end transverse bar member 54 of the jaw structure is an additional guiding arm 163 which cooperates with diverging plates forming centering device 102. When centering members 163 and 102 are driven home, as in FIGS. 7 and 8, the bottom and front track parts will be aligned horizontally and vertically. When the track sections are thus aligned, the banding material 165 in FIG. 7, moving rightwardly as indicated by the arrow, may readily pass across the joint between the mating track sections. Similar guiding elements on the left ends of track sections 84 and curved sections 157 on the rear track sections assure alignment of these portions of the track. Consequently, when the front and back jaw structures are lowered, as in FIGS. 2 and 3, continuous, smooth tracks are provided entirely around the press through which banding structure may be guided from storage reels.

The operation of the novel banding machinery is as follows: to initially load the machine with banding stock, bands are fed from the storage reels through appropriate guiding structures, including tubes 110 of FIGS. 1 and 2 between the pairs of band driving clutch rolls 111 and 113, through the relaxed jaw members 121 and 131 and the upper front track section 107, thence through tagging magazine 144 and into upper curved front track section 105. With the jaw structures 51 and 52 elevated by means of hydraulic motor 70, a press box loaded by the tramper will be swung into position above the ram 20 and there locked. In the usual manner, the doors are locked and the ram is then hydraulically lifted so as to drive follow block structure 29 upwardly through the press box so as to compress the load of cotton therein. At the proper point in this compressing action, the ram motion is stopped and the front and back doors of this particular box are opened, as shown in FIG. 2 and the box side walls 24 are tilted outwardly to clear the bale all around. Hydraulic motor 70 is then energized for lowering the track guide carrying jaw structures until the curved bottom track sections 106 and 157 are seated against and center bottom track sections 84. Preferably the follow block will be stopped slightly below the position in which the bottom tracks are approximately aligned vertically with curved track sections 106 and 157 so that the bottom tracks are free to be shifted upwardly as required. The sequence of banding is then initiated, either automatically or by a manual switch which starts motor 147 and de-energizes solenoid 118 to rotate clutch bell crank 114 clockwise to cause rollers 111 and 113 to grip banding stock 109 and drive the same through the now aligned track sections until the free end overlaps the portion of the banding previously inserted through the banding head. When the end of the band engages lever 153, switch 154 is actuated to operate solenoid 118, after a closely adjusted time delay, for withdrawing clutch roller 113 to stop the band feed and to cause jaws 121 to grip the end of the band. This timed delay is just sufficient to permit the overlapping part of the band to reach approximately the position shown in FIG. 9 at 172.

At the termination of this timed delay period, band driving rollers 111 and 113 are re-engaged and reversed in rotation as to to draw the band backwardly and to strip the band from the tracks. Resilient track flanges 78 and 79 yield to permit stripping of the band to the broken line position indicated at 173 in FIG. 3 in which the top, bottom, and rear portions of the band now snugly engage the compressed bale, while the forward portions 174 and 175 of the band remain gripped by the banding head and separated from the front face 176 of the bale.

Next in proper sequence, seal securing plungers 129 are advanced to firmly lodge a seal in position to which it has been driven previously and blade 126 is advanced to sever the band stock 109 from the bale enveloping part thereof, the end of the stock itself remaining in guideway 176. Hydraulic motor 128 returns to its original position releasing both sets of jaws 121 and 131 and re-engages arm 138 to seal advancing arm 135.

Next, the guide carrying jaw structures are elevated, the bagging material customarily stretched over platen bars 31 and 42 is wrapped about the front and back of the bale and tucked under the now relaxed end banding. Finally, follow block 29 is lowered sufficiently to cause tightening of the banding entirely around the bale, and the bale is removed. The operation is then repeated by the rotation of the other box, now supplied with a charge of tramped cotton, to the press position and proceeding as before.

The form in FIGS. 11–15 is generally similar to that previously described, except that the track guide carrying structures 180 and 181 are constructed to slide vertically with respect to the press box, rather than to swing pivotally. Track carrying structures 180 and 181 are made up of parallel plates 182 and 183, spaced apart as are plates 53 and 56 in the previous form. Similarly functioning band controlling heads 184 and feeding mechanisms symbolized at 185 are mounted between the plates of the front structure, the bands 186 being fed to the front track sections 187 and 188 between clutching rollers 189 and 190, thence through top track sections 191, rear track sections 192, 193, 194, and 195, bottom track section 196 and lower front sections 197, 198 and 199, in general as in the previous form.

In order to support and guide the track mounting front and back structures, the heavy upright side frame member 201 at the side of the press section and center structure 202, which support heavy top sill structure 203, are extended upwardly, as at 204 and 205. Top platen bars 206 are mounted on the under surface of top sill 203 in the usual manner. A pair of bars 207 and 208 extend across the top of the top sill so as to divide the length of the sill approximately into thirds. A pair of channel beams 209 and 210 span the space between side frame extensions 204 and 205 above and parallel to press top sill 203. A pair of bars 211 and 212 are in vertical alignment with previously mentioned bars 207 and 208. Extending through and secured to the projecting ends of aligned bars 207 and 211 and 208 and 212 are four vertical poles, only poles 213, 214, and 215 being visible in FIGS. 11 and 12. A pair of parallel cross beams 216 and 217 connect the tops of track carrying structures 180 and 181 and these beams are slidably received on poles 213, 214 and 215.

Figure 13:
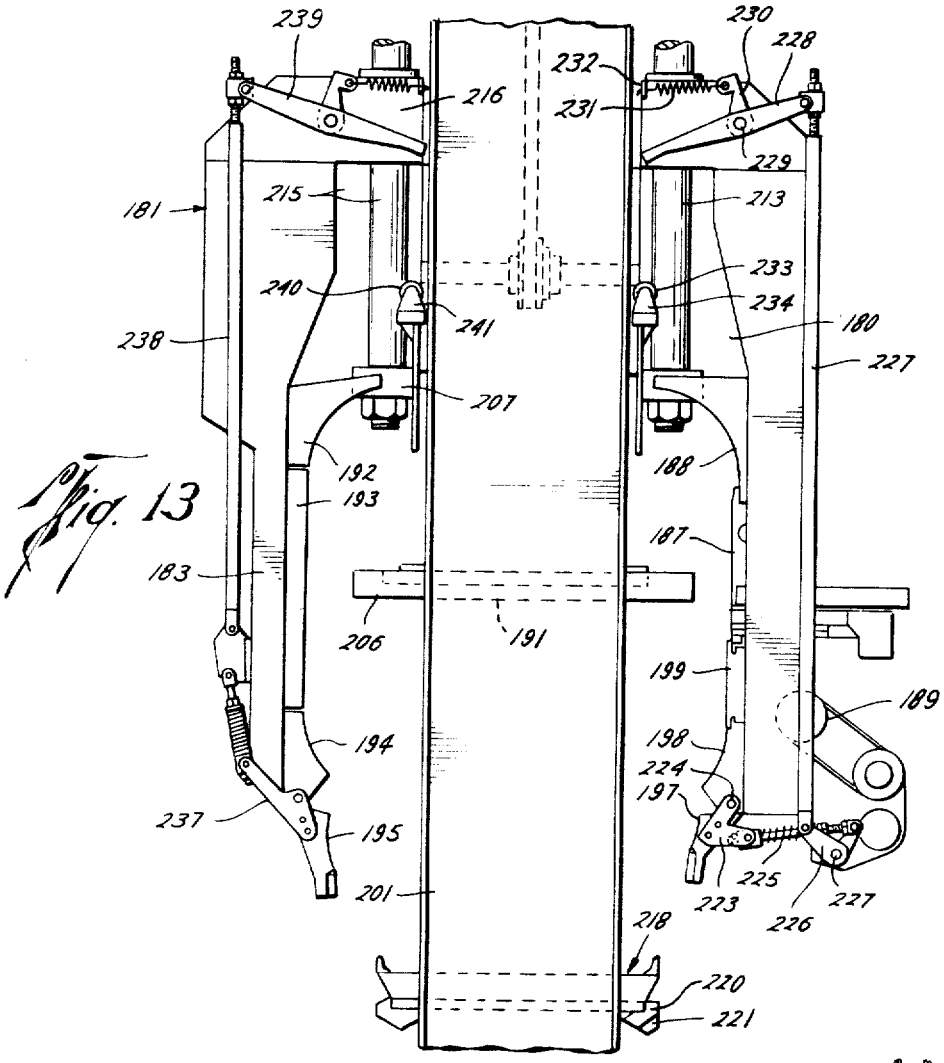
FIG. 13 is a side view showing parts of the structure in FIGS. 11 and 12, but with the banding apparatus in an intermediate position.
Figure 14:
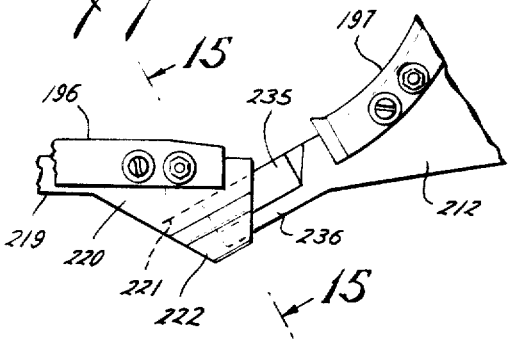
FIG. 14 is a detailed, enlarged side view showing meeting bottom and front parts of the band guide structure of the modified form.
Figure 15:
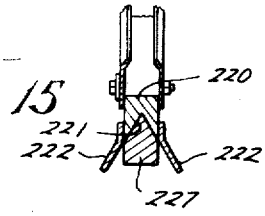
FIG. 15 is a detailed cross section taken on lines 15—15 of FIG. 14.

FIGS. 13, 14 and 15 illustrate most clearly the means for insuring proper registry and alignment of the front and back track forming sections with those carried by the follow block structure 218. Each end of the bottom track body portion 219 is enlarged at 220 and provided with an inclined dovetail recess 221. Angles 222 extend these recesses. The curved sections at the lower ends of the front and back track sections are split, as at 194, 195, and 197, 198. A bell crank 223 is rigidly secured to lower curved section 197 and is pivoted at 224 to adjacent curved section 198. The other arm of the bell crank 223 is connected by a link 225 to a bell crank 226 centrally pivoted at 227 to the track support structure. The other arm of bell crank 226 is pinned to a long vertical link 227 which is secured at its upper end to one end of a lever 228 centrally pivoted at 229. An arm 230 projects from the center of lever 228 and is connected by a tension spring 231 anchored at 232 to the track support structure for urging lever 228 counterclockwise so as to normally maintain lower curved track section 197 in the opened position, as shown in FIG. 13. The free end of lever 228 is in position to engage a roller 233 mounted on a fixed bracket 234 when the track support structures are lowered. When this engagement occurs, linkage 228, 227, 226, 225 and 223 cooperates to urge lower curved track section 197 to the closed position, as in FIGS. 11 and 14. In this position, the wedge-shaped upper surface 235 at the end of track body extension 236 is received within dovetail recess 221 so as to force the corresponding lower track 196 into close alignment with curved sections 197, 198, and 187.

The lower curved section 195 at the bottom of each rear track section is similarly actuated by means of a lever 237 and long vertical link 238, a pivoted lever 239, and a stop roller 240 carried by fixed bracket 241.

Figure 12:
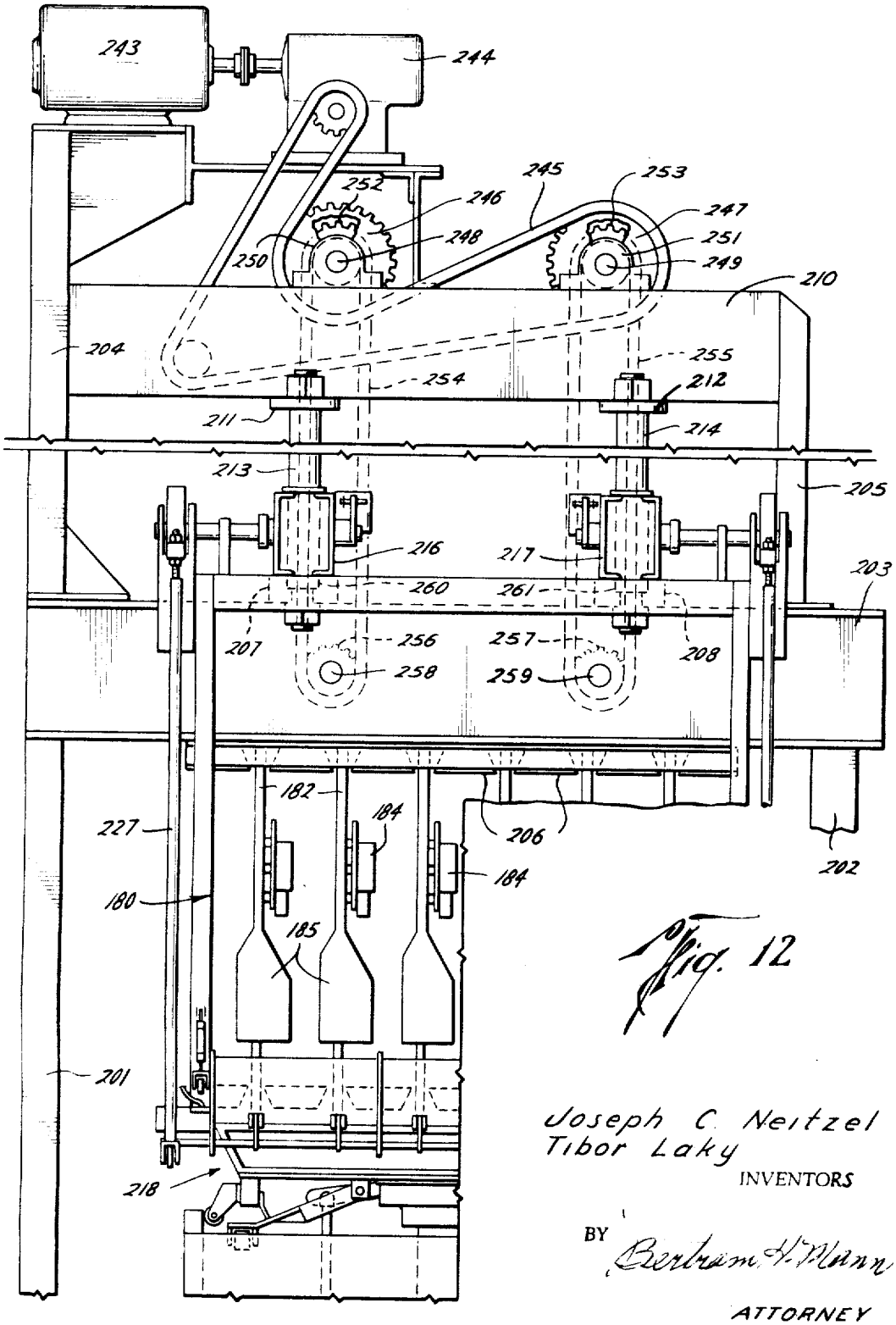
FIG. 12 is a front view of the structure in FIG. 11.

As best shown in FIGS. 12 and 13, the track supporting yoke formed by structures 180 and 181 and cross beams 216 and 217 may be elevated by means of a motor 243 and gear box 244 mounted on top of super structure, which drives a chain 245. Chain 245, in turn, drives sprockets 246 and 247 rigid with shafts 248 and 249 journalled in brackets 250 and 251 upon top cross framing beams 209 and 210. Also rigid on cross shafts 248 and 249 are aligned sprockets 252 and 253. Chains 254 and 255 mesh with the latter sprockets and extend to sprockets 256 and 257 journalled on cross shafts 258 and 259 extending between the side walls of press top sill structure 203. Knuckle elements 260 and 261 secured to chains 254 and 255 underlie cross beams 216 and 217 for carrying the track supporting structures upwardly therewith as the chains are actuated. The track support structures may be lowered by gravity and restrained by counter electromotive force applied through motor 244 or other braking means.

The operation of the modified form is the same as in the previous form, except that energization of motor 243 causes vertical lifting and lowering of the track supporting structures, instead of pivoting thereof. With these structures in a closed position, as in FIG. 11, clutch rolls 189 and 190 will be actuated to feed the banding 186 through the track and in overlapped relationship through the sealing head structure, generally designated 184.

Thus, the novel banding machinery is well equipped for operating on bales of cotton where the bands must extend around the sides of the bale which face the doors through which access to the bale is had for applying the wrapping fabric and through one of which the bale must be withdrawn. It is, of course, not feasible to withdraw the bale through the side of the press box and, in a two-box tramper press, as herein shown, the rotation of the boxes to and from the press position necessitates removal of the band guide tracks from the paths of the boxes. This has not been possible heretofore with the use of any known banding equipment. Various modifications may be made in the structure disclosed herein as will occur to those skilled in the art and the exclusive use of all modifications as come within the scope of the appended claims is contemplated.

We claim:

1. The combination in a baling press including a top sill structure with an upper platen, side beams, a press box having front and back doorways with doors therefor and a bottom platen movable in said box for forming the bale, said platens and said doors defining a baling chamber of automatic banding means comprising banding guide tracks for [surround] *surrounding* said chamber including parts movably supported on said top sill structure and extending, in banding positions, across said doorways, means for feeding banding through said tracks and securing the same about the bale, and means for shifting said track parts clear of said doors to permit opening of said doors and access to and removal of the bale.

2. The combination described in claim 1 in which said track parts are pivotally mounted on said top sill structure.

3. The combination described in claim 1 in which said track parts are slidably supported by said sill structure.

4. The combination with a baling press including a box having a doorway with a door and a bale forming platen loosely movable within said box, of banding apparatus including first and second band guide track parts extending respectively across said doorway and said platen, said first track part being shiftable from a position clear of said doorway to permit opening thereof to a banding position across said doorway and intersecting said second track part, at least the intersecting portion of one of said track parts being resiliently mounted and said parts having interfitting inclined plane elements for insuring alignment of said parts when moved together.

5. The combination described in claim 4 in which said first track part is pivotally mounted and said second track part is resiliently mounted on said platen, said parts having, respectively interfitting V and dovetail guide elements.

6. The combination described in claim 4 in which said first track part is slidable across said doorway and includes an extreme portion pivotally connected to the remainder thereof for interfitting with the inclined plane elements on said second track part.

7. The combination with a baling press having a press box formed of side and top walls, at least one doorway, and a movable bottom platen having spaced bale engaging bars, of banding means including a plurality of first band guiding track parts extending between said bars, spring means supporting said track parts from said platen, other track parts extending in banding position across said doorway and intersecting said first track parts, and means for shifting said other track parts clear of and across said doorway, said platen being capable of disalignment within said box during formation of a bale and there being interfitting V and dovetail guide elements at the intersections of said track parts for insuring vertical alignment of said parts withstanding disalignment of said platen.

8. The combination described in claim 7 further including framing beneath said platen bars and mounting said first track parts and other framing movably mounted adjacent said doorway and mounting said other track parts, and interfitting V and dovetail guide elements on said framing for insuring horizontal alignment of said track parts.

9. The combination described in claim 7 further including a powered ram actuable against said platen, guide walls extending along said ram, and guide elements projecting from said platen and cooperating with said walls to assist in centering said platen.

10. The combination in a two box bailing press including a massive upright frame with a central vertical pivot post defining press and filler spaces, a press ram and a top sill structure including a top platen located adjacent said press space, and a pair of side by side boxes rotatably mounted on said post, each box having front and back doorways with doors, side walls, a top platen, and a movable follow block at the bottom defining a bale forming chamber, of banding means comprising band guide tracks surrounding said chamber and including parts movably mounted on said top sill structure and means for shifting said track parts from operative positions extending across the doorways of the box in said press space to inoperative positions clear of said latter doorways to permit opening of the doors of said latter box for access to and removal of the bale.

*11. The combination with a baling press including a box having a doorway with a door and a bale forming platen loosely movable within said box, of banding apparatus including first and second band guide track parts extending respectively across said doorway and said platen, said first track part being shiftable from a position clear of said doorway to a banding position across said doorway and intersecting said second track part, at least the intersecting portion of one of said track parts being resiliently mounted and said parts having interfitting elements for insuring alignment of said parts when moved together.*

*12. The combination with a baling press including a box having side, front, and back faces, means for clearing a face of said box for access to and removal of a bale from said box, and a bale forming platen loosely movable within said box, of banding apparatus including first and second band guide track parts extending respectively across said box face and said platen, said first track part being shiftable from a position clear of said face to a banding position across said face and intersecting said second track part, at least the intersecting portion of one of said track parts being resiliently mounted and said parts having interfitting elements for insuring alignment of said parts when moved together.*

*13. The combination with a baling press including a box, means for clearing a face of said box for removal of a bale from said box, and a bale forming platen movable within said box, of banding apparatus including first and second band guide track parts extending respectively across said box face and said platen, said first track part being shiftable from a position clear of said face to a banding position across said face and intersecting said second track part.*

References Cited

The following references, cited by the Examiner, are of record in the patented file of this patent or the original patent.

UNITED STATES PATENTS

| | | | |
|---|---|---|---|
| 150,818 | 5/1874 | Brown | 100—25 X |
| 625,307 | 5/1899 | Adams | 100—232 X |
| 1,038,430 | 9/1912 | Phelps | 100—223 X |
| 1,805,791 | 5/1931 | Treat | 100—25 X |
| 2,707,429 | 5/1955 | Leslie et al. | 100—26 X |
| 2,780,986 | 2/1957 | Ritenour | 100—25 |
| 2,801,507 | 8/1957 | Claus et al. | |
| 2,831,422 | 4/1958 | Black et al. | 100—3 X |
| 2,853,938 | 9/1958 | Hall et al. | 100—26 |
| 2,876,696 | 3/1959 | White | 100—25 |
| 2,959,118 | 11/1960 | Hager | 100—26 |
| 2,985,098 | 5/1961 | Winkler | 100—25 |
| 3,010,386 | 11/1961 | Sinclair et al. | 100—25 |
| 3,220,337 | 11/1965 | Goland et al. | 100—7 |

BILLY J. WILHITE, *Primary Examiner.*